United States Patent [19]

Kuhn

[11] Patent Number: 4,594,087
[45] Date of Patent: Jun. 10, 1986

[54] THREE-TERMINAL CONTROLLER FOR FIBER GLASS BUSHING

[75] Inventor: John J. Kuhn, Pittsburgh, Pa.
[73] Assignee: PPG Industries, Inc., Pittsburgh, Pa.
[21] Appl. No.: 718,609
[22] Filed: Apr. 1, 1985
[51] Int. Cl.[4] .............................................. C03B 37/07
[52] U.S. Cl. ........................................ 65/1; 65/162; 65/DIG. 4; 219/494; 219/504; 373/28
[58] Field of Search ............ 65/1, 2, 29, 162, DIG. 4; 373/28, 136; 219/483, 494, 504

[56] References Cited

U.S. PATENT DOCUMENTS

| | | | |
|---|---|---|---|
| 3,969,098 | 7/1976 | Jensen | 65/1 |
| 4,017,287 | 4/1977 | Jensen | 65/29 X |
| 4,167,403 | 9/1979 | Coggin | 65/1 |
| 4,272,271 | 6/1981 | Thompson | 65/1 |
| 4,285,712 | 8/1981 | Thompson | 65/29 X |
| 4,515,614 | 5/1985 | Barkhau et al. | 65/29 |
| 4,546,485 | 10/1985 | Griffits et al. | 373/28 |

Primary Examiner—Robert Lindsay
Attorney, Agent, or Firm—John E. Curley

[57] ABSTRACT

A bushing controller circuit for regulating the current flow through a fiber glass bushing to thereby control the temperature of the molten glass being drawn into fibers is disclosed. The bushing temperature is measured by a plurality of thermocouples which produce an average temperature reading that is used to control the power fed to the bushing. The bushing controller circuit is a three-terminal device connected across two sections of the bushing to regulate relative current flow in the two sections, in order to control the amount of fiber produced by each section. The bushing controller circuit includes a pair of timing circuits which operate in response to the polarity and magnitude of a control signal, produced at a remote control panel, to control the conductivity of a corresponding pair of current control devices connected across respective sections of the bushing. A reset circuit produces a signal corresponding to the zero crossing of the input AC power to synchronize the timing circuits.

11 Claims, 8 Drawing Figures

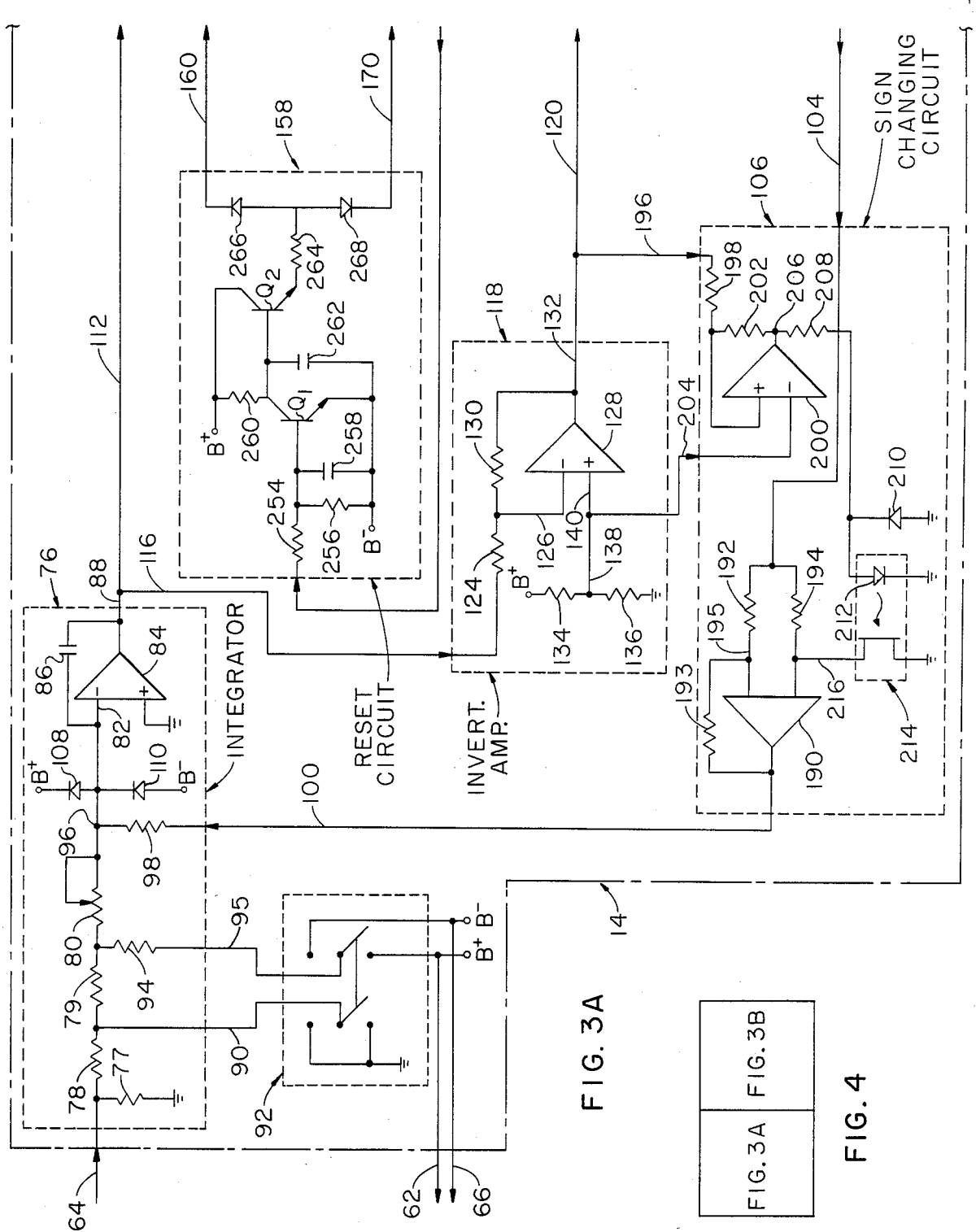

THREE-TERMINAL CONTROLLER FOR FIBER GLASS BUSHING

BACKGROUND OF THE INVENTION

The present invention relates, in general, to apparatus for producing uniform strands of glass fiber from different sections of a fiber glass bushing, and, more particularly, to a remotely controllable three-terminal circuit for regulating the current flow in, and the temperature of, sections of a fiber glass bushing.

Glass fibers are produced by drawing multiple streams of molten glass at a given rate of speed through orifices or nozzles located in a heated container, known in the fiber glass industry as a bushing. The bushing contains molten glass which is electrically heated and maintained at a given temperature to provide molten glass at a desired viscosity at each of the orifices. The maintenance of a uniform temperature across the face of the bushing; that is, across the area of the bushing on which the orifices are located, is important in providing uniform fiber formation at each orifice.

The fibers drawn from the orifices of a bushing are gathered, after they solidify, into one or more strands, which are then collected on a collet to produce one or more forming packages. In recent years, bushings have increased in size so that bushing having 800 to 2,000 or more orifices are commonplace. It is also common practice to produce more than one strand from larger bushings, and to wind those strands on a single collet to produce corresponding forming packages. Typically, this is accomplished by using one side of a bushing to produce one strand, and the other side to produce a similar second strand. Splitting the bushing in this manner, to produce more than one strand, requires precise control of the bushing temperature from side to side, so that the strands so produced and collected on a collet will have the same yardage, that is, the same number of yards per pound of glass in a formed package, collected over a given period of time. Even small variations in temperature between the two sides of a split bushing will produce substantial differences in the fibers produced at the orifices, and this will be evidenced by a substantial variation in the weights of the forming packages produced by the respective strands.

In recognition of the foregoing problem, various attempts have been made to compensate for such differences, for example, by adjusting air flow to the bushing, adjusting fin cooler placement under the bushing orifices, adjusting terminal clamp positions on the bushing, and the like. Adjustments of the bushing structure are, at best, a function of operator skill, and fall short of being satisfactory, since such changes are manual, time consuming, and imprecise. An improvement over such mechanical adjustments is the system shown in U.S. Pat. No. 4,024,336, which describes a system which controls two sides of a bushing by using two full-wave variable impedance devices to regulate current transmitted to the bushing by a power transformer. Although this device permits the relative yardage of two strands produced from a split bushing to be manipulated, the device has not always been effective because, as a change on one side of the bushing occurs, it is always accompanied by a change on the other side. Further, the system described in this patent requires the use of a temperature controller on each side of the bushing, as well as two full-wave variable impedance devices, and, thus, is a costly system on a per-bushing basis.

In U.S. Pat. No. 4,546,458 and assigned to assignee of the present application, the disclosure of which is hereby incorporated herein, a bushing controller is described in which a variable impedance shunt is connected in parallel with the bushing and with the secondary of the power transformer which feeds current to the bushing. The variable impedance is provided by a potentiometer consisting of a resistance element having a wiper arm, or tap. The resistance element is connected across the ends of the bushing, and the tap is connected to a center point on the bushing, so that movement of the tap alters the impedance connected across the two halves of the bushing.

While the system described in U.S. Pat. No. 4,546,485, effectively controls the current in the bushing from side to side, that system has been found to be unreliable, since it requires periodic mechanical adjustment of a moveable tap which is normally located close to the bushing, and is subject to contamination by the moist environment and the chemical binders normally present in a glass fiber-forming area. Further, the mechanical adjustment of a potentiometer tap lacks precision, and, thus, does not provide totally satisfactory control.

Accordingly, a need exists for a system which will produce a precise and reliable control of the temperature of the forming surface and of the orifices in a fiber glass bushing to enable such a bushing to produce consistent fibers throughout the bushing. Further, a need exists to provide a control system which remains free of contaminants for long-term reliability, and which can be controlled from an area remote from the fiber-forming area, so that numerous bushings can be regulated from a central location.

SUMMARY OF THE INVENTION

It is an object of the present invention to provide a reliable, durable, control system for regulating the temperature of fiber glass bushings.

Another object of the present invention is to provide a system for controlling the current flowing through the face plate of a bushing wherein the control system operates free of atmospheric contaminants.

A still further object of the invention is to provide a control system capable of regulating the current flow in a plurality of bushings from a single central location, remote from the production environment.

Another object of the invention is to provide circuitry for controlling bushing current flow, wherein the circuitry is more reliable than that which has heretofore been employed.

In accordance with the invention, a conventional bushing power supply includes an AC power pack which supplies current through a power transformer, the secondary of which is connected across a bushing. A plurality of thermocouples are associated with the bushing to sense the temperatures at various locations thereon. The outputs of these thermocouples are fed to a temperature-averaging circuit, the output of which is supplied to a main temperature controller which regulates, by way of the power pack, the AC power supplied directly to the bushing, and, thus, regulates the overall temperature of the molten glass supplied to the bushing orifices. However, as is known, the temperature of the bushing, and thus, of the glass supplied to the orifices, may vary from one side of the bushing to the other, with the result that strands produced by the two sides of the bushing will include fibers of different diameters, and thus will form packages of different weights over a given period of time. In accordance with the invention, a three-terminal bushing controller is connected byway of two of its terminals across the bushing, and, by way of its third terminal, to an intermediate point, or tap, on a bushing, the intermediate point and the two ends of the bushing defining two sections. The bushing controller regulates the relative current flow through the two sections, and thereby controls the relative temperature of the two sections. A variable set point is provided by a remote controller to permit an operator at a remote location to adjust the relative current flow through the two sections of the bushing, thereby to maintain the temperatures at the two sides of the bushing substantially equal, so that equal quantities of fibers will be produced.

The three-terminal controller, in the preferred form of the invention, includes two variable impedance current control devices such as thyristor devices, preferably triacs, connected in series across the bushing, with the junction of the thyristors being connected to an intermediate point on the bushing, dividing the bushing into two sections. This connection is made through a current bypass that includes a current detector, which senses the difference in the current through the two sections, to provide a feedback control for the controller.

The two thyristors are each controlled by a corresponding timing circuit to be conductive for selectable portions of the positive and the negative half-cycles of the AC power supplied to the bushing. One timing circuit and its associated thyristor regulates the current flow through one section of the bushing, while the other timing circuit and its corresponding thyristor regulate the current flow through the remainder of the bushing. When conductive, each thyristor shunts current around its corresponding bushing section, the timing circuits selecting the time during the AC power half-cycles when the thyristors become conductive, to thereby regulate the power supplied to the respective sections of the bushing. A current detector, responsive to the current diverted around one or the other section of the bushing, provides a feedback signal which controls the timing circuits.

Control of the timing circuits is by way of an adjustable operator set point which is established at a remote location by means of, for example, a potentiometer. The set point signal is of selectable polarity to allow selection of which thyristor is to become conductive, and of selectable magnitude to allow selection of the time in each power half-cycle when the thyristor becomes conductive. This enables an operator to control the relative temperatures of the bushing sections. The control set point signal is supplied to an integrator, where it is compared to the feedback signal, with the sum of the set point and feedback signals producing a control output signal having a magnitude and polarity which determines the time in each half-cycle of the AC power at which the timing circuits trigger their respective thyristors.

The three-terminal controller may be used in combination with one or more additional such controllers in a single bushing, to segment the bushing to permit the formation of more than two packages from a single bushing on a single collet. Such an arrangement allows regulation of the temperature of each section to equalize the weight of the packages formed over a period of time. In some cases, it is found necessary to provide current boosters for selected controllers to ensure even temperatures throughout the bushing.

Control systems in accordance with the foregoing have been operated in multiple-section bushings, to produce multiple-forming packages from that bushing. Tests have shown a significant improvement in the average weight differences between the packages, illustrating a substantial improvement in temperature control over prior systems.

The provision of a system for adjusting the set point of a bushing controller at a remote location removes the adjustable set-point mechanism from the contaminated environment of the bushing, thus improving the accuracy and reliability of the control system. The bushing controller circuit is solid state, and, thus, has no moving parts, so that it may be sealed and protected from the contamination present in the atmosphere surrounding the bushing. Furthermore, the remote control arrangement allows numerous bushings to be adjusted by a single operator at one location.

BRIEF DESCRIPTION OF THE DRAWINGS

The foregoing and additional objects, features, and advantages of the present invention will become apparent from the following detailed description of preferred embodiments thereof, taken in conjunction with the accompanying drawings, in which:

FIGS. 3a and 3b are a schematic diagram of the bushing controller of FIG. 2;

FIG. 4 is a diagram illustrating the relationship between FIGS. 3a and 3b;

DESCRIPTION OF THE PREFERRED EMBODIMENT

Figure 1:
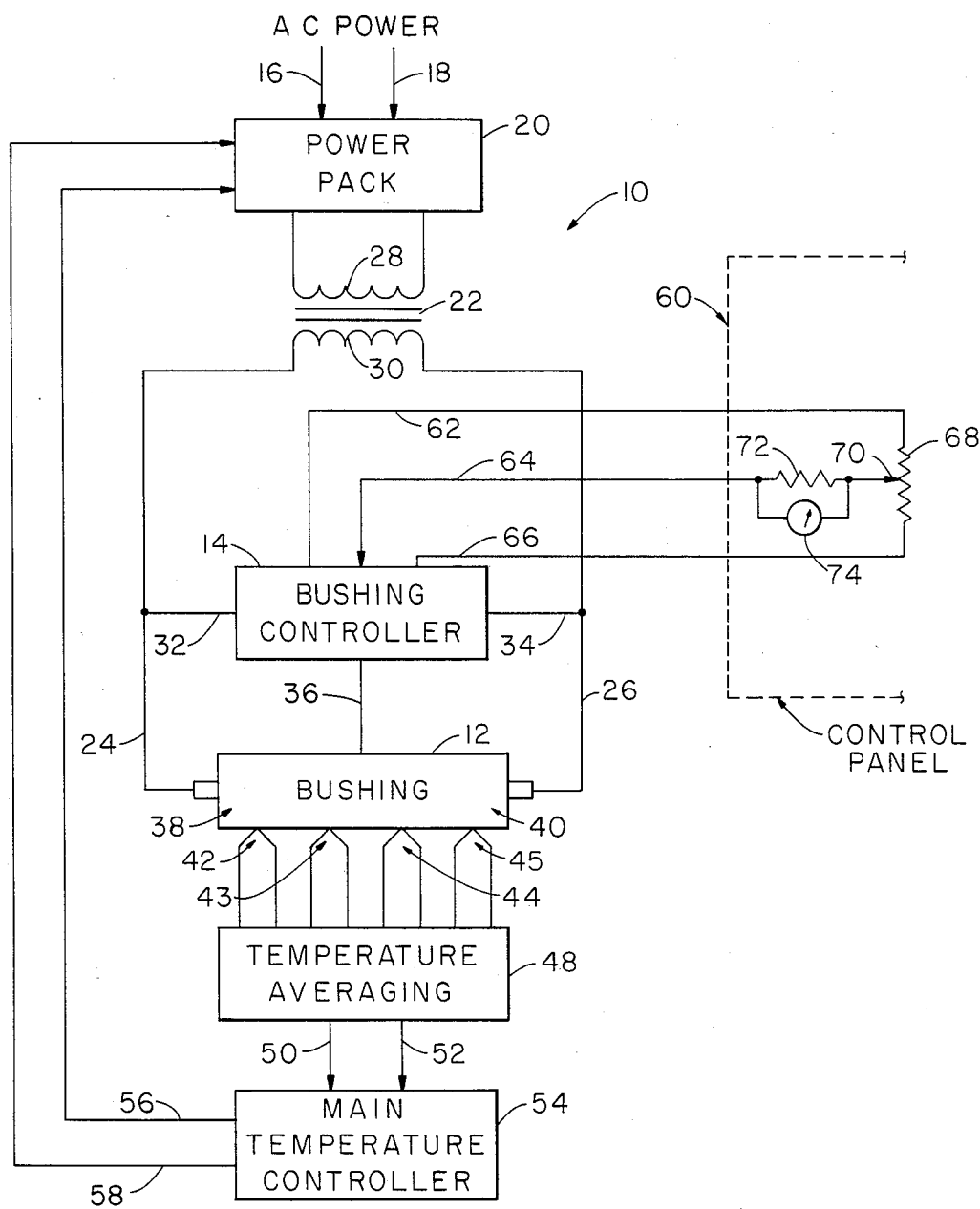
FIG. 1 is a diagrammatic illustration of a bushing control system incorporating the three-terminal bushing controller of the present invention.

Referring now to the diagrammatic illustration of FIG. 1, there is illustrated at 10 a temperature control system for a conventional fiber glass bushing 12, the system including at 14 a three-terminal bushing controller in accordance with the present invention. The system includes a pair of input lines 16 and 18, by which AC power is supplied to the bushing by way of a power pack 20, a power transformer 22, and power lines 24 and 26. The power pack 20 supplies AC power to the primary winding 28 of transformer 22, its secondary winding 30 being connected to lines 24 and 26. A pair of input leads 32 and 34 connect the bushing controller 14 across lines 24 and 26, and, to thereby connect the controller in parallel to the bushing 12 and to the secondary winding 30. The bushing controller is also connected by way of a current bypass line 36 to an intermediate tap on the bushing 12, to thereby segment the bushing into sections 38 and 40.

It will be understood that the bushing 12 incorporates a multiplicity of orifices (not shown), from which glass fibers are drawn. The fibers drawn from section 38 may be formed into one strand, while the fibers from section 40 may be drawn into a second strand, the two strands then being directed to a collet to form first and second (or "front" and "back") strand packages. The strands are formed by an equal number of fibers, so that if the temperatures of the two bushing sections are equal, the fibers produced by the respective orifices will be essentially equal in diameter, and the packages formed on the collet in a given time period will be of essentially equal weight.

A plurality of temperature sensing devices, such as thermocouples 42, 43, 44 and 45, are connected to the bushing to provide output signals which are supplied to a temperature averaging circuit 48, which may be of the type illustrated in the aforesaid copending application Ser. No. 556,828. The temperature averaging circuit 48 produces an output signal on lines 50 and 52, which represents the average temperature of the bushing 12. This signal is supplied to a main temperature controller 54, which produces a main temperature control signal on lines 56 and 58. The main temperature control signal is supplied to the power pack 20, which, in turn, adjusts the current supplied to the primary coil 28 of the transformer 22 to thereby regulate the power supplied by way of transformer 22 to the bushing 12.

The main temperature controller 54 thus responds to the average temperature of the bushing 12 to regulate the power supplied from the AC power source; however, controller 54 cannot identify and cannot correct variations in temperature along the length of the bushing. More specifically, controller 54 cannot correct the differences in temperature between, for example, sections 38 and 40. Control of the latter differences is accomplished by bushing controller 14, by means of a set point signal supplied from a control panel 60, which may be remotely located from the environment of bushing 12. The control panel is connected to the bushing controller 14 by means of control leads 62, 64, and 66, the leads 62 and 66 providing positive and negative supply voltages for the control panel, and lead 64 carrying a set point control signal of selected polarity and magnitude for the bushing controller 14.

The positive and negative supply voltages on lines 62 and 64 are connected in the control panel to opposite ends of a potentiometer 68 having an adjustable slide wire tap 70. A voltage of desired polarity and magnitude is selected from the potentiometer by adjusting the position of the slide wire. This is done by the system operator to regulate the current in the bushing sections 38 and 40, in the manner to be described. The voltage on arm 70 is connected through a resistor 72 to lead 64 and thence to the bushing controller 14. Preferably, a voltmeter 74 is connected across resistor 72 to provide a measurement and indication of the control signal being supplied to lead 64, and is used by the operator in adjusting the bushing controller.

Figure 2:
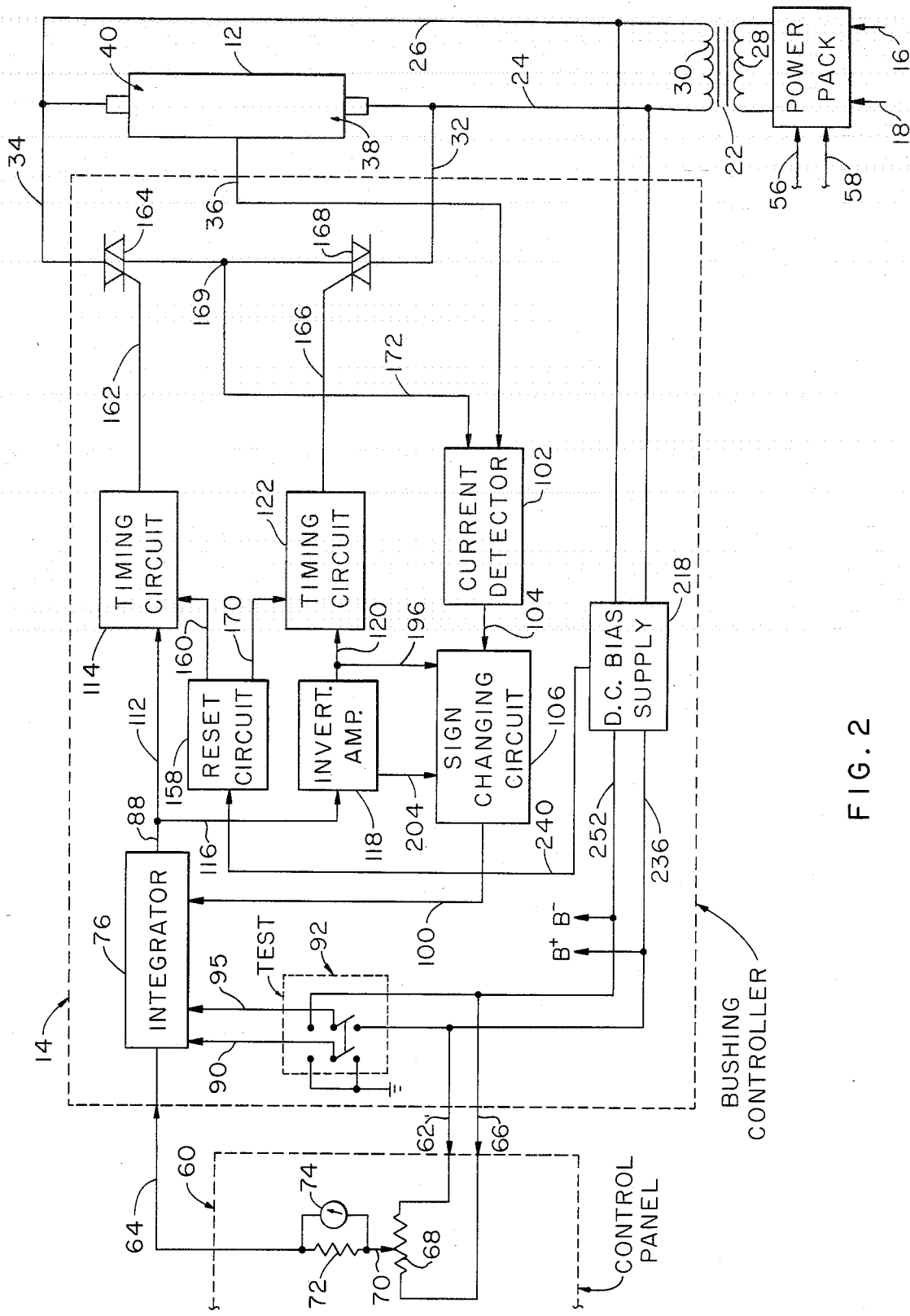
FIG. 2 is a block diagram of a preferred form of the bushing controller of FIG. 1.
Figure 3B:
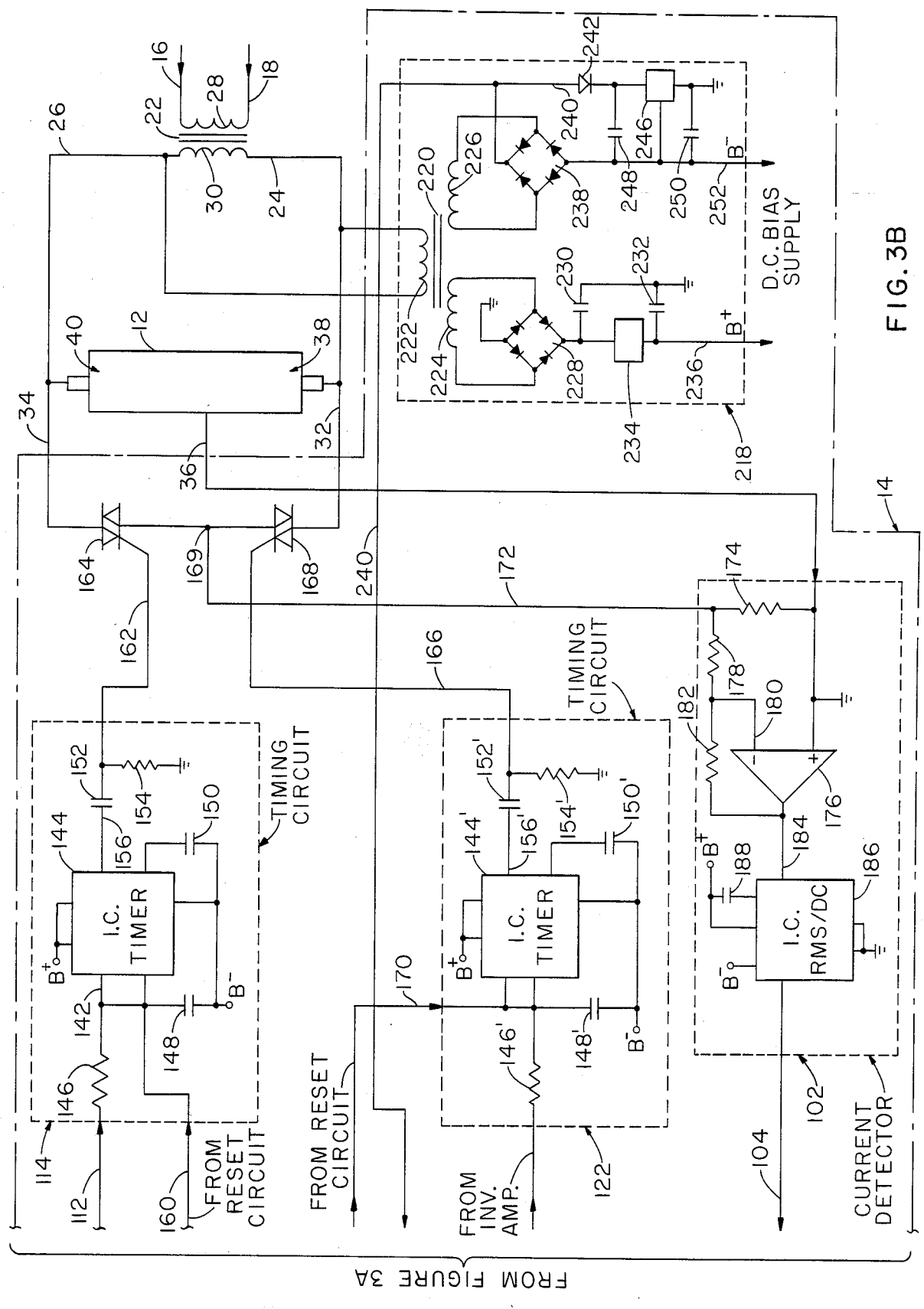

As indicated in FIG. 2, 3a, and 3b, the set point control signal on line 64 is supplied to an integrator network 76. This signal is applied across a shunt resistor 77, through series resistors 78 and 79, and through a potentiometer 80 to one input 82 of an operational amplifier 84. A capacitor 86 is connected between the output 88 of the amplifier and its input 82.

Resistor 77 provides a suitable input impedance to the integrator 76 so that the direct current supplied at input line 64 produces a voltage within a desired working range. The junction between resistors 78 and 79 is connected by way of line 90 to one terminal of a test switch 92. The junction between resistor 79 and potentiometer 80 is connected by way of resistor 94 and line 95 to the other side of test switch 92, the switch comprising a double-pole, double-throw switch by which a test voltage of either positive or negative polarity can be supplied to potentiometer 80. When switch 92 is in its center position, as shown, the voltage supplied to potentiometer 80 is that which is supplied to the integrator 76 by way of line 64.

Connected to the junction point 96, located between potentiometer 80 and input 82, is a resistor 98, which receives a feedback current by way of feedback line 100. Resistor 98, potentiometer 80, operational amplifier 84, and capacitor 86 form an integrator in which junction 96 functions as a virtual ground, and remains near zero voltage in normal operation. At junction 96, the voltage supplied to the integrator, either by the test switch 92 or by set point line 64, is compared to the feedback voltage supplied on line 100. This feedback voltage is directly proportional to the root means square (rms) of the current flowing through line 36 from the bushing 12 to the bushing controller 14 (FIG. 1), which current is measured by a current detector 102. The output of the detector 102 is supplied by way of line 104 to a sign-changing circuit 106, which produces a feedback voltage on line 100 of opposite polarity to that of the set point signal on line 64, or the test signal provided by switch 92. Potentiometer 80 is adjusted to obtain the desired ratio between the feedback signal on line 100, and the set point signal on line 64.

A pair of limiting diodes 108 and 110 are connected at junction 96 at the input line 82 of the operational amplifier 84. These diodes are non-conducting during normal operation, and serve to limit the voltage at junction 96 in the event that a larger-than-desired current is supplied on either line 64 or line 100.

The output of integrator 76 is a DC signal on line 88 having an amplitude which is a function of the difference between the set point signal on line 64 and the feedback signal on line 100. This different signal is supplied by way of line 112 to a first timing circuit 114, and by way of line 116 through an inverting amplifier 118 and a line 120 to a second timing circuit 122.

The signal on line 116 is supplied to inverting amplifier 118 through an input resistor 124 to one input 126 of a unity gain amplifier 128 having a feedback resistor 130 connected between its output line 132 and input 126. A voltage divider consisting of series resistors 134 and 136 provides a bias voltage by way of line 138 to the second input 140 of the amplifier 128. The output voltage on line 132 from inverting amplifier 118 is the inverse of the integrator output voltage on line 88, with a bias voltage superimposed on it. This voltage is supplied by way of line 120 to timing circuit 122.

The signal from integrator 76 appearing on line 122 is supplied to a first input 142 of an integrated circuit timer 144 by way of an input resistor 146. Input line 142 to the timer 144 is also connected by way of timing capacitor 148 to a source of negative bias voltage. The timer is also connected through a second capacitor 150 to the negative bias voltage, while the output of the timer 156 is connected through a series capacitor 152 and across an output resistor 154 to an output line 162. Capacitor 148 is periodically charged, or reset, to a positive voltage by a reset circuit 158 by way of input line 160. This resetting occurs at the zero crossover point of the AC power supplied to the bushing 12, as will be described, and the positive voltage applied to capacitor 148 raises the voltage at input line 142 of timer 144 to a predetermined positive threshold which causes the timer output on line 156 to be negative. After charging, capacitor 148 discharges through resistor 146 at a rate determined by the time constant of resistor 146 and capacitor 148, and by the voltage appearing at the output line 112 from integrator 76. As the capacitor discharges, the voltage at input lead 142 will gradually decrease, until it passes the timer threshold, at which point the voltage at the output of the timer 144 switches to a positive value. If the discharge rate is slow enough that the voltage at input line 142 does not decrease below the timer threshold before a subsequent recharging of capacitor 148 by the reset circuit 158, then the integrated circuit timer 144 will remain in its reset condition, and the output voltage on line 156 will remain negative. On the other hand, if the discharge rate of capacitor 148 is sufficient to decrease the voltage at lead 142 below the timer threshold, then the output voltage on line 156 will switch from negative to positive. This rising voltage at output 156 is supplied to a gate 162 of a controllable variable impedance such as a thyristor device 164, which preferably is a triac, and causes the thyristor to switch to a conductive state. Resistor 154 maintains a zero voltage at the gate lead 162 in the absence of a rising or falling voltage at output 156. The capacitor 150 stabilizes the positive and negative thresholds determined by the integrated timer 144.

Thus, it will be seen that timer 114 is periodically reset to an off condition by the reset circuit 158 when it charges the capacitor 148 to a positive value. The capacitor gradually discharges, with the rate of discharge being dependent on the output of the integrator, and, thus, on the difference between the current flowing in the intermediate tap of the bushing and the set point determined by the operator. This output from the integrator determines when in a cycle of the AC power source the timer 144 will produce a triggering output signal which will activate the thyristor 164.

Timing circuit 122 is similar in structure to timing circuit 114, and, accordingly, its components are similarly numbered, but primed. The circuit 122 operates in a similar fashion to timing circuit 114, except that capacitor 148' is discharged through resistor 146' at a rate which is controlled by the voltage of the output of inverting amplifier 118, as applied by way of line 120, and that the timing circuit output voltage at output 156' is coupled by capacitor 152' to a gate input 166 of a second variable impedance device such as a thyristor 168 connected in series with thyristor 164 at junction 169. The thyristors 164 and 168 are connected in series across bushing 12 by way of lines 32 and 34. Capacitor 148' is charged by a positive voltage from reset circuit 158, which is supplied by way of line 170.

As previously indicated, the voltage on line 120 supplied by the inverting amplifier 118 is of opposite polarity to the signal applied by integrator 76 by way of line 112 to timing circuit 114. Furthermore, the signal on line 120 has superimposed on it the bias signal supplied to amplifier 128 by voltage divider resistors 134 and 136, so that the timing circuits 114 and 122 produce thyristor trigger pulses at different times, so that when one thyristor is conducting, the other is not.

When both thyristors 164 and 168 are off, current from power transformer 22 is supplied by way of lines 24 and 26 to bushing 12, and flows through the entire length thereof. When either of the thyristors is conductive, however, that thyristor shunts the section of the bushing to which it corresponds for that portion of the AC cycle for which it is on. The conducting period of each thyristor is determined by the rate at which the corresponding capacitor 148 or 148' discharges, and, thus, the time during the cycle at which the timer 144 or 144' triggers the corresponding one of thyristors 164 and 168. When thyristor 164 is on, for example, AC current from winding 30 will flow through line 26, line 34, thyristor 164, a current bypass which includes current detector input line 172 connected to the junction 169 between the two thyristors, a current detector input resistor 174 (FIG. 3B), and intermediate tap line 36, and through section 38 of the bushing 12, through line 24 back to the transformer winding 30. When thyristor 168 is switched on, AC current flow will be from secondary winding 30, through line 26, through section 40 of bushing 12, through line 36, resistor 174, line 172, thyristor 168, and line 32, and thence through line 24 back to winding 30. Thus, when thyristor 164 is conducting, section 40 of the bushing is bypassed, and when thyristor 168 is conducting, section 38 of the bushing is bypassed, thereby allowing a difference in current to flow through the different sections of the bushing to regulate the temperature of the two sections.

The voltage appearing across resistor 174 in the current detector 102 is directly proportional to the current in lead 36, and is thereby a measure of the differential between the current flow in the two bushing sections. This voltage is supplied to an operational amplifier 176 by way of resistor 178 and amplifier input line 180. A feedback resistor 182 is connected between the output line 184 of amplifier 176 and its input 180. The output appearing on line 184 is an AC voltage having an amplitude proportional to the current flowing in line 36, and this signal is supplied to an integrated circuit converter 186, which converts the root means square (rms) value of the signal on line 184 to a corresponding DC value which appears on output line 104. The current detector 102 produces a positive voltage at line 104 which is directly proportions to the rms value of the current appearing in lead 36. Capacitor 188 determines the response time of the rms to DC converter 186.

The output signal on line 104 is supplied to a sign-changing circuit 106 (FIG. 3A), the signal being applied to the two inputs of an operational amplifier 190 by way of input resistors 192 and 194. A feedback resistor 193 is connected between the output line 100 and input 195 of operational amplifier 190. A second input is provided to the sign-changing circuit 106 from the output 132 of the inverting amplifier 118. This signal is applied by way of line 196 and resistor 198 to one input of an operational amplifier 200 which has a feedback resistor 202. The second input to the operational amplifier 200 is connected to the voltage divider consisting of resistors 134 and 136 by way of line 204. The operational amplifier 200 forms a voltage comparator which produces a positive voltage at its output 206 whenever thyristor 164 receives a trigger pulse, and which produces on output 206 a negative voltage whenever thyristor 168 receives a trigger pulse. The values of resistors 198 and 202 are selected to provide sufficient hysteresis in the circuit to assure stable voltage comparator operation.

When the voltage on output 206 is negative, a current flows through resistors 208 and diode 210; on the other hand, when the voltage 206 is positive, current flows through resistors 207 and the input diode 212 of an optical coupler 214. Diode 210 limits the negative voltage which can be applied to the optical coupler, while resistor 208 limits the current in diode 210 and in the optical coupler diode 212. As a result, when the output of amplifier 200 is positive, optical coupler 214 is switched to a conducting state, and produces an output on line 216 which is supplied to one input of amplifier 190.

The operational amplifier 190 and the optical coupler 214 form a unity gain amplifier which can be selected as either inverting or non-inverting, as determined by the conduction state of optical coupler 214. When coupler 214 switches to its conducting state, due to a positive voltage at line 206, the unity gain amplifier produces a negative voltage at output line 100 which is the inverse of the positive voltage at input line 104. On the other hand, when the voltage at line 206 is negative (when thyristor 168 is triggered), the optical coupler 214 switches to a non-conducting state, and the unity gain amplifier produces a positive voltage at lead 100, which is of essentially the same magnitude as the positive voltage at lead 104. Thus, the current detector and the sign-changing circuit form a negative feedback loop which tends to maintain in lead 36 a current of a constant rms value which is directly proportional to the operator's set point current on line 64. The current on lead 36 passes through either thyristor 164 or 168, as determined by the polarity of the direct current control signal in line 64. The time at which the thyristor 164 or 168 turns on in each positive and negative half-cycle of the power source depends upon the amplitude of the set point voltage on line 64. Thus, the section of the bushing 12 which is selectively bypassed is determined by the polarity of the set point control signal, while the magnitude of the bypass current is dependent on the amplitude of the set point control signal.

A DC bias supply network 128 provides positive and negative bias voltages for operating the solid state circuitry of bushing controller 14, and also provides a zero crossing signal which activates the reset circuit 158. The power supply 218 includes an input transformer 220 connected across a suitable source of power, such as the secondary winding 30 of power transformer 22. Transformer 220 includes a primary winding 222, and a pair of secondary windings 224 and 226. A positive bias source is obtained from secondary winding 224 by way of a full-wave rectifier bridge 228, filter capacitors 230 and 232, and a voltage regulator 234. The output from regulator 234 consists of a positive, regulated DC bias voltage appearing on line 236.

A negative source of bias voltage is provided by a second rectifier bridge 238 connected across secondary winding 226, the output of the bridge being connected by way of line 240, diode 242, regulator 246, and filter capacitors 248 and 250 to an output line 252 on which a regulated negative bias voltage appears. The positive line 236 and the negative line 252 are connected to the controller circuitry, where indicated, to supply operating bias voltage, line 236 being connected to the points in the circuit indicated at B+, and the line 252 being connected to the points in the circuit labelled B−. The positive and negative points are also connected to lines 62 and 66, which lead to the control panel 60 to supply control power thereto, as previously explained.

Diode 242 in the bias supply circuit 218 is provided so that a voltage is produced on line 240 which equals the negative supply voltage when the voltages on lines 24 and 26 are zero, and which is greater than the negative supply voltage B− at other times. Thus, the voltage on line 240 varies but produces an identifiable zero crossing signal. This zero crossing signal is supplied by way of line 240 to the input of reset circuit 158, through input resistor 254 and across an RC input filter comprised of resistor 256 and capacitor 258 to the base of a transistor Q1. The emitter of Q1, as well as resistor 256 and capacitor 258, are connected to a negative bias point B−. The collector of Q1 is connected through bias resistor 260 to a positive bias, and is also connected across capacitor 262 and to the base of a second transistor Q2. The collector of Q2 is connected directly to the positive bias, while the emitter is connected through an output resistor 264 and through a first diode 266 to output line 160 and through a second diode 268 to output line 170.

When the voltage on zero crossing line 240 is greater than the negative supply voltage (i.e., is not at a zero crossing), transistor Q1 conducts, and the voltage on its collector is low. Transistor Q2 is, therefore, in a non-conducting state, so no current flows through either diode 266 or 268. In this condition, the capacitors 148 and 148′ in the timing circuits 114 and 122 can discharge, as previously explained.

When the voltage on zero crossing line 240 is equal to the negative supply voltage B−, transistor Q1 switches to a non-conducting state, and the voltage at its collector rises toward the positive supply voltage. This shifts transistor Q2 to a conducting state, and current is supplied through diodes 266 and 268 to charge capacitors 148 and 148′ to positive voltages greater than the threshold voltages of the integrated circuit timers 144 and 144′. This resets the two timing circuits.

Input resistor 254 limits the current into the base of transistor Q1, while resistor 256 shunts collector leakage current from the base of transistor Q1 to the negative supply. Capacitors 258 and 262 slow the response of the reset circuit 158 to provide immunity to extraneous electrical noises at the output of power transformer 22. Resistor 260 provides base drive current to transistor Q2, while resistor 264 limits the charging current which is supplied to capacitors 148 and 148′.

In operation, a voltage of alternating polarity is applied to the fiber glass bushing and, at the same time, to lines 32 and 34. At each zero crossing of this alternating voltage, timing circuits 114 and 122 are reset. After a timed delay which is a function of the magnitude of the set point control current at input line 64, either thyristor 164 or 168 will be triggered, as determined by the polarity of the control current. At the subsequent polarity reversal of the current supplied to the bushing, as detected at intermediate line 36, any conducting thyristor is commutated and enters a non-conducting state.

Figure 5:
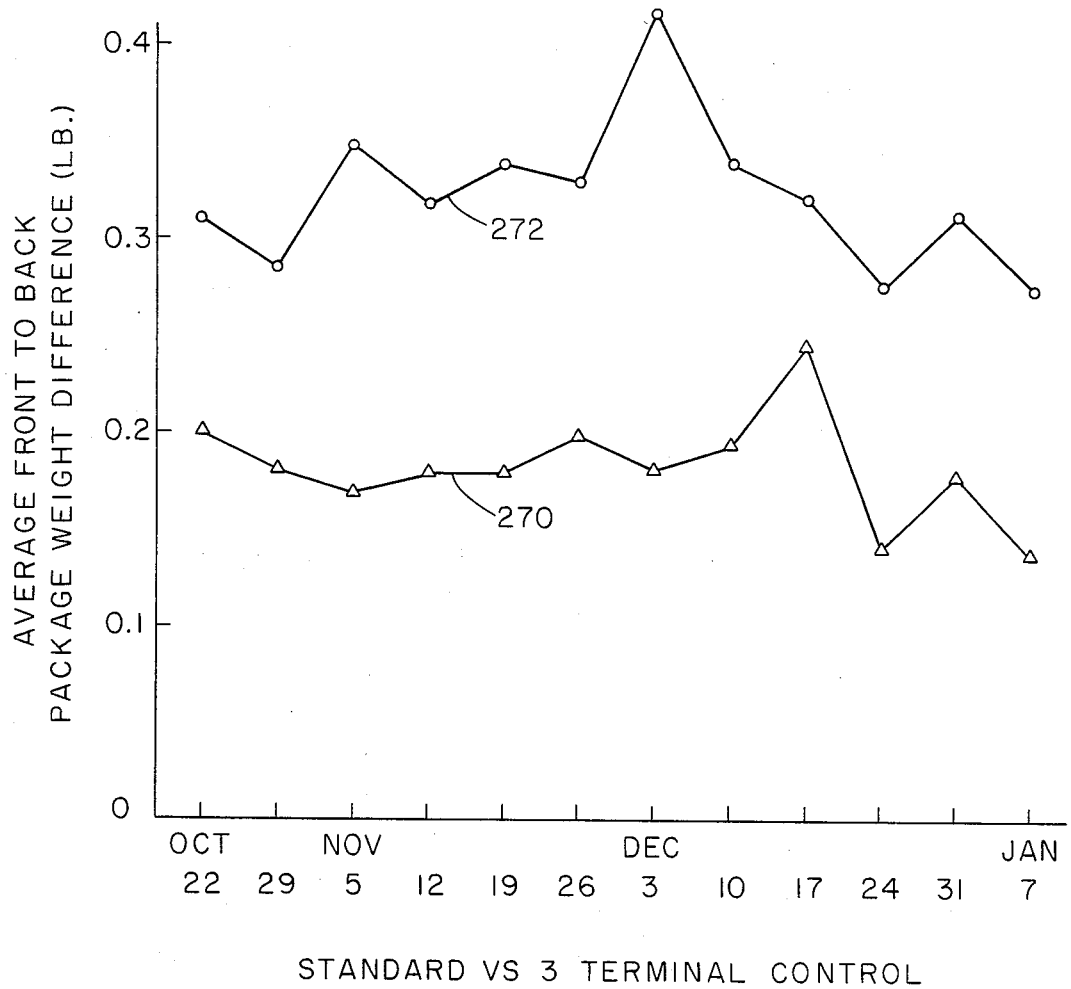
FIG. 5 is a graphical illustration of the results obtained from a test of the bushing controller of the present invention.

In a test of the system of the present invention, it was found that improved control of forming packages could be obtained, whereby only very small changes in package weight differential were observed, illustrating that much more precise control of the bushing could be obtained with the present system than with the prior tested systems. As illustrated in FIG. 5, measurements were made of the difference in package weight between front and back packages produced by a set of bushings. These measurements showed that the differences were consistently lower using the three-terminal control system, than were obtained using standard, fin cooler adjustment controls. Thus, as illustrated by graph line 270, the difference in weight between front and back packages using the three-terminal controller approximated 0.2 pounds throughout the test period, whereas the difference between front and back packages in a fin cooler adjustment control device, as indicated at graphite line 272, average on the order of 0.3 pounds.

Figure 6:
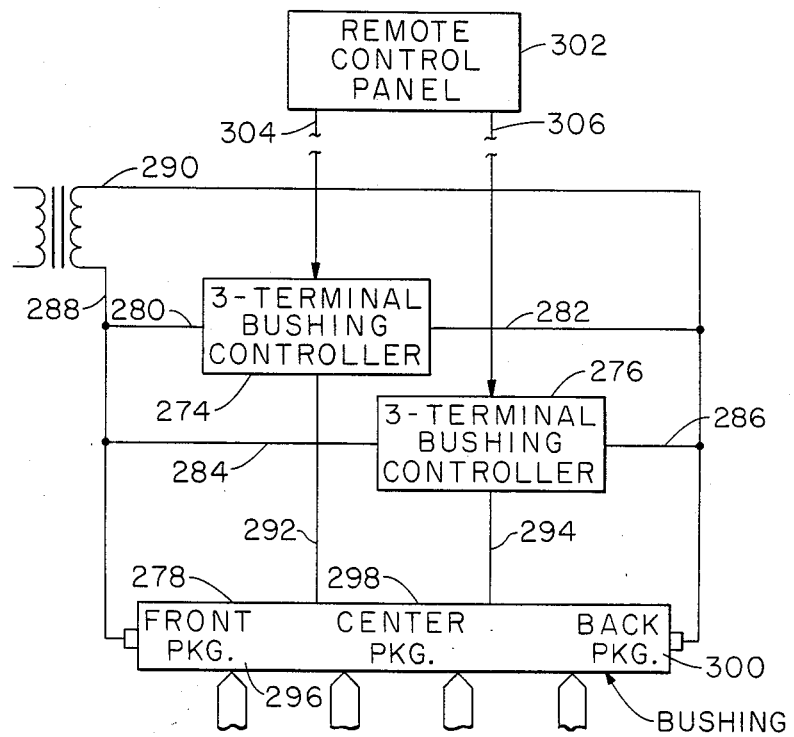
FIG. 6 is a diagrammatic illustration of two bushing controllers connected to a single bushing.
Figure 7:
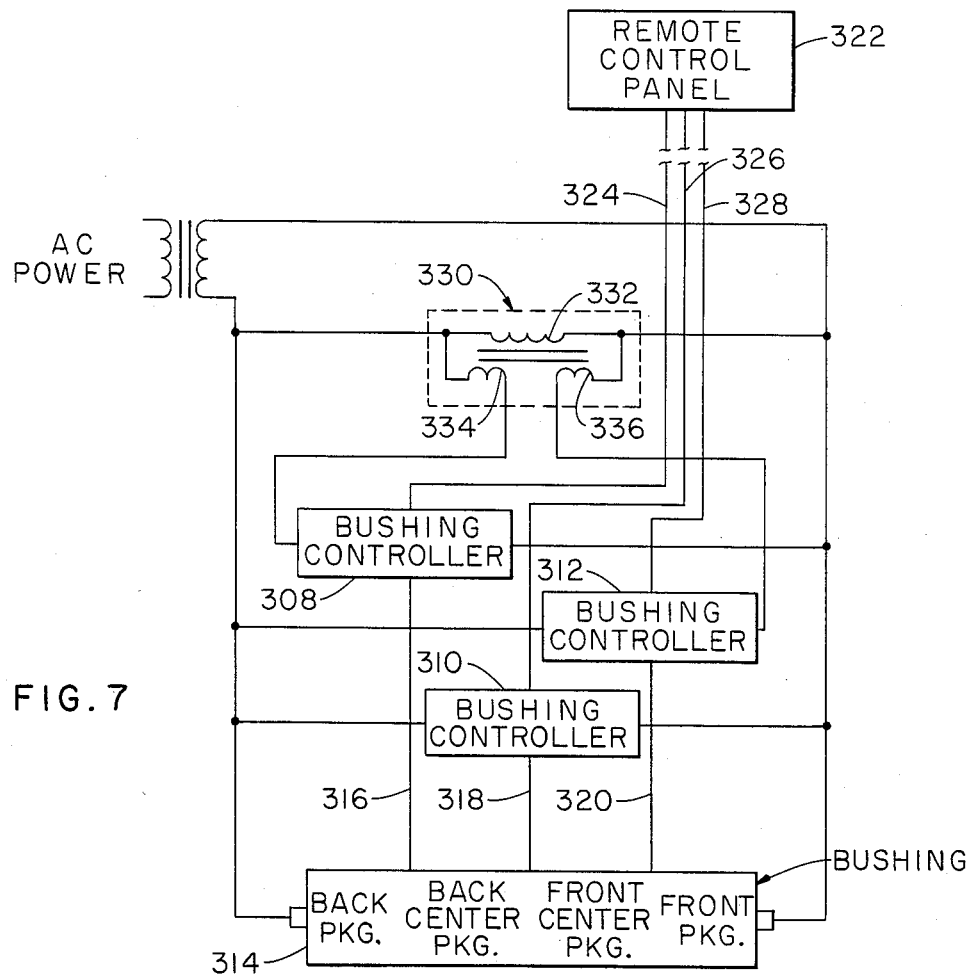
FIG. 7 is a diagrammatic illustration of a three-controller system for a single bushing in accordance with the present invention.

The three-terminal bushing controller 14 may be used in multiples of two, three, or even more, as illustrated in FIGS. 6 and 7. In such cases, the controllers are connected to a single bushing in the manner described hereinabove with respect to FIG. 1, but with the intermediate taps for each controller being located at different positions on the bushing, so as to provide multiple control sections. Thus, for example, FIG. 6 illustrates the use of two bushing controllers 274 and 276, connected to a bushing 278. The main terminals 280 and 282 of controller 274, and the main terminals 284 and 286 of controller 276 are connected across the bushing power supply lines 288 and 290 in the manner previously explained. However, the intermediate tap 292 for controller 274, and the intermediate tap 294 for controller 276 are connected to different locations on the bushing 278, thereby dividing the bushing into three sections. A front section 296, a center section 298, and a back section 300 are formed, whereby accurate control from a remote control panel 302 providing set point control signals, by way of lines 304 and 306, to the controllers 274 and 276, respectively.

In similar manner, as illustrated in FIG. 7, three bushing controllers 308, 310 and 312, may be connected to a single bushing 314, with intermediate connections 316, 318, and 320, serving to divide the bushing into a back package section, a back center package section, a front center package section, and a front package section. These sections are under the control of an operator at a remote control panel 322, which provides set point control signals by way of lines 324, 326, and 328, to the controllers 308, 310 and 312, respectively.

It has been found that in systems such as that illustrated in FIG. 7, when multiple controllers are used, it is possible that insufficient voltage could be experienced at the taps 316 and 320, so that insufficient control current would be available for the corresponding back package and front package sections of the bushing. This can be overcome by the provision of a boost transformer 330 having a primary winding 332 connected across the AC power supplied to the bushing, with secondary windings 334 and 336 supplying the necessary voltage to controllers 308 and 312, respectively. Operation of these bushing controllers is as previously described.

Thus, there has been disclosed a new and unique bushing controller which permits reliable and precise control of the temperature of molten glass in a bushing, so as to permit precise regulation of the amount of fiber glass produced by the orifices in each section. Although the invention has been described in terms of preferred embodiments, it will be understood that variations may be made without departing from the true spirit and scope thereof, as set forth in the following claims.

I claim:

1. A three-terminal fiber glass bushing controller comprising:

first and second variable impedance means connected in series with each other and adapted to be connected in shunt with the fiber glass bushing;

current bypass means connected to the junction of said first and second variable impedance means and adapted to be connected to an intermediate tap on said fiber glass bushing;

selectable set point control means for producing a control signal; and circuit means including first and second timing means responsive to said control signal for controlling the conductivity of said first and second variable impedance means, respectively, whereby one or the other of said variable impedance means is adapted, when connected to a bushing, to selectively bypass corresponding portions of the bushing.

2. The controller of claim 1, wherein said selectable set point control means produces a control signal of selected first or second polarity to select a corresponding one of said first or second timing means, and of selected magnitude to regulate the duration of operation of the selected first or second timing means, to thereby select and regulate the duration of conductivity of said first and second variable impedance means.

3. The controller of claim 2, wherein said circuit means further includes feedback means responsive to current flow in said current bypass means to maintain the conductivity of said first and second impedance means at the selected duration.

4. The controller of claim 3, wherein said set point control means is locatable at a remote location.

5. The controller of claim 3, wherein said circuit means further includes inverter means; and integrator means responsive to said set point control means and to said feedback means, said integrator means having an output connected directly to said first timing means and connected through said inverter means to said second timing means, said integrator producing an output signal responsive to the polarity and magnitude of said set point control signal for controlling said first and second timing means.

6. The controller of claim 5, wherein said circuit means further includes reset means for periodically resetting said timing means.

7. The controller of claim 6, wherein said first and second variable impedance means are adapted to be connected across a source of AC power, and wherein said reset means is responsive to the zero crossing of the source of AC power.

8. The controller of claim 7, wherein said first and second variable impedance devices are first and second thyristors, respectively, said first and second timing circuits being connected to trigger one or the other of said thyristors to conduct at selected times in the cycles of said AC power.

9. In combination, a fiber glass bushing having a power control circuit including a power transformer having a secondary winding connected across the bushing, a power pack connected to the primary winding of the power transformer, a temperature controller responsive to the temperature of the bushing and connected to the power pack, and a bushing controller for controlling the relative temperatures of sections of the bushing, the bushing controller comprising:

first and second controllable impedance devices connected in series across the bushing and across the secondary winding of the power transformer;

current bypass means connected between the junction of said first and second controllable impedance devices and an intermediate tap on the bushing, said intermediate tap defining first and second sections of the bushing, whereby each of said first and second controllable impedance devices is connected across a corresponding, one of said first and second bushing sections;

set point controller means; and circuit means responsive to said set point controller means to activate one or the other of said first and second controllable impedance devices to shunt current around its corresponding bushing section to thereby control the relative current flow in the bushing sections.

10. The system of claim 9, wherein said circuit means further includes timing means responsive to said set point controller means, and reset means for said timing means, said reset means being responsive to the zero crossover of the power supplied by said power transformer.

11. The system of claim 10, wherein said circuit means further includes current detector means connected to said current bypass means for producing a feedback signal corresponding to the current bypassing the first or second sections of the bushing, said timing means being further responsive to said feedback signal.

* * * * *